May 22, 1956  J. R. HUFF  2,746,496
SHAPING TOOL FOR PATTERNS HAVING ARCUATE RECESSES
Filed Jan. 14, 1953  2 Sheets-Sheet 1

JAMES R. HUFF
INVENTOR.

BY *Cecil L. Wood*

ATTORNEY

May 22, 1956  J. R. HUFF  2,746,496
SHAPING TOOL FOR PATTERNS HAVING ARCUATE RECESSES
Filed Jan. 14, 1953  2 Sheets-Sheet 2
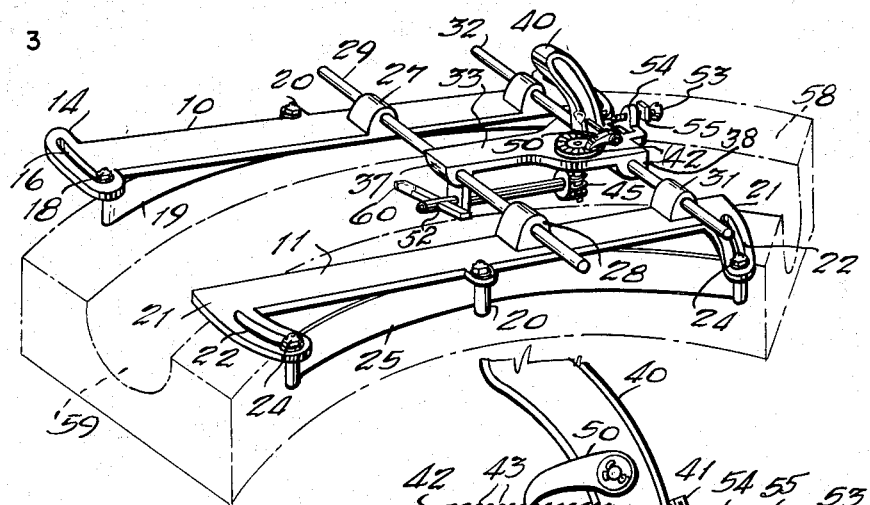
FIG. 3
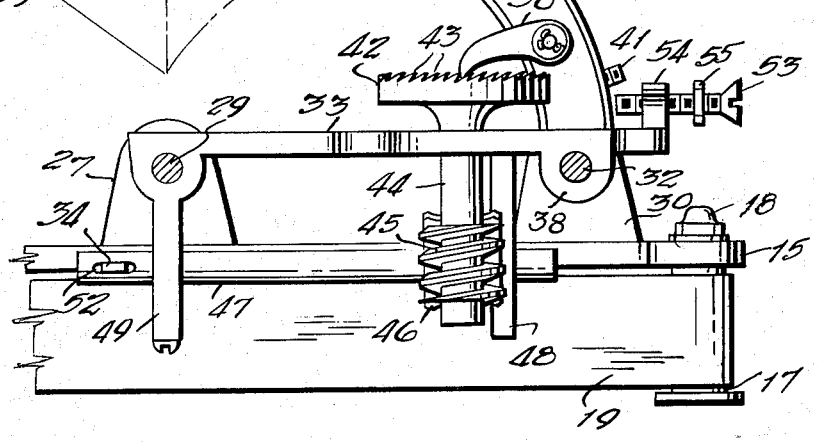
FIG. 4
FIG. 6  FIG. 5
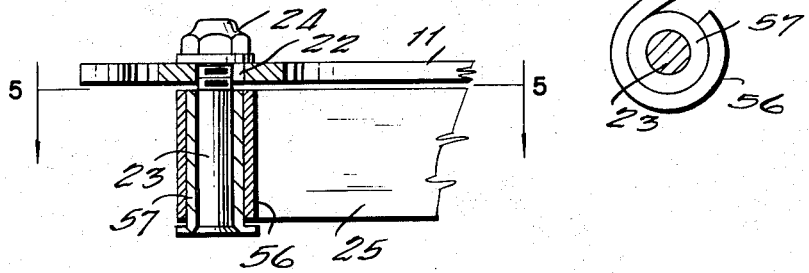
JAMES R. HUFF
INVENTOR.
BY Cecil L. Woods
ATTORNEY

United States Patent Office

2,746,496
Patented May 22, 1956

---

2,746,496

SHAPING TOOL FOR PATTERNS HAVING ARCUATE RECESSES

James R. Huff, Shreveport, La.

Application January 14, 1953, Serial No. 331,271

4 Claims. (Cl. 144—136)

This invention relates to planing or routing tools, and the like, and it has particular reference to a tool especially designed for planing or routing patterns for mold boxes used in forming or casting bends for cast iron or soil pipe, and its principal object resides in the provision of a light and simple structure capable of being adjusted to cut arcuate troughs arranged in a horizontal plane in wooden forms generally prepared by a series of laminations of relatively thin material and which are sawed, or otherwise formed, in the radius in which the pipe bend is to be made, the invention being employed to form a suitable groove or recess, which is semi-circular in section, and which is arcuate in accordance with the desired radius of the bend to be cast or formed therein.

The invention further contemplates the provision of a means for cutting arcuate grooves, particularly employed in the manufacture of patterns which are utilized to form molds for cast iron pipe bends so that the foundry molds can be constructed more economically and with a great saving in labor and time, the invention embodying a mechanism which provides for the gradual planing or routing of the groove by affording a mechanism which moves the cutting element a short space transversely of the arcuate groove after each stroke and providing a means for adjusting the cutting element for depth so that a pattern may be prepared for forming a mold in a fraction of the time required for the pattern to be formed by hand.

Broadly, the invention contemplates the provision of a simple device which can be readily adjusted to operate on several radii so that patterns can be made for different radial pipe bends, particularly in the manufacture of bends for cast iron soil pipe, it being customary to prepare the patterns by hand, requiring considerable time in their preparation.

While the foregoing objects are paramount, other and lesser objects will become manifest as the description proceeds, taken in connection with the appended drawings wherein:

Figure 3 is a perspective view of the invention as operated, showing a typical pattern in broken lines.

Figure 4 is a fragmentary longitudinal sectional view showing the ratchet wheel and worm, and illustrating the handle adjustment.

Figure 5 is a fragmentary plan view of a guide element, illustrating the posts therefor in transverse section on lines 5—5 of Figure 6.

Figure 6 is a fragmentary cross-sectional view through one of the terminals of the guide elements, on lines 6—6 of Figure 1, showing the manner in which the same is connected to its post.

It is common practice to form patterns for the preparation of molds for casting bends for cast iron or soil pipe manually and such operations are generally very tedious and require long and careful operations which of necessity render such operations expensive. It is desirable to increase production and reduce the cost thereof by forming the wooden patterns from which the molds are created by a suitable tool which will reduce the time element and therefore increase production. The invention is designed to cut the required channel or groove in the pattern, from which the foundry mold is prepared, with a tool which operates in a manner similar to a plow plane but which is capable of adjustment in a radius transverse to the radius of the groove which is being formed by the device. Arcuate guides are being provided whereby the mechanism can be adjusted to different radii as desired, depending upon the radius of the bend of the cast iron or soil pipe to be formed.

Figure 1:
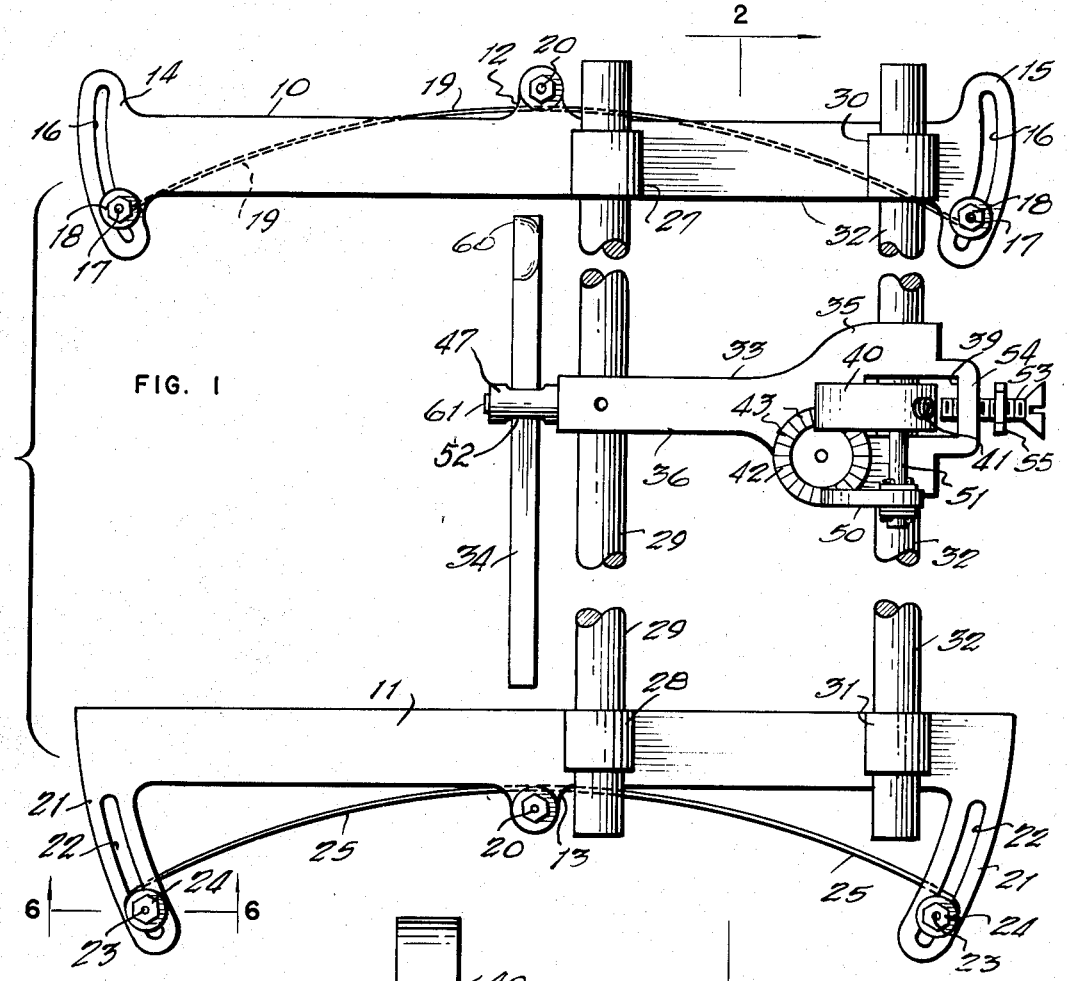
Figure 1 is a plan view of the invention illustrating the cutting element, the handle and rotating mechanism for the cutting element, and the tensioned arcuate guide members.

Accordingly, the invention comprises a frame structure consisting of right- and left-hand members 10 and 11 formed with laterally projecting ears 12 and 13, respectively, intermediate their ends. On each end of the member 10 is provided substantially arcuate portions 14 and 15, forwardly and rearwardly of the mechanism, respectively, as shown in Figure 1. Each member 14 and 15 has an arcuate slot 16 therein and a bolt 17 having a nut 18 thereon is arranged in each of the slots 16 and provides an anchor post at each end of a flexible guide member 19 which is arched to any desired degree by moving the bolt 17, at each end of the member 10, along the slot 16, a bolt 20 being arranged in the ear 12 of the member 10 to properly support or stabilize the flexible guide member 19 intermediate its ends.

The member 11 is formed with laterally extending curved members 21 which have arcuate slots 22 formed therein and which latter have bolts 23 extending therethrough and having nuts 24 thereon. The bolts 23 provide anchor posts at each end of another tensioned guide member 25 which may be flexed to any desired radius, according to the limitations of the arcuate slots 22, and supported intermediate its ends by a bolt 20 arranged through the ear 13 intermediate the ends 11, previously mentioned and illustrated in Figure 1.

Each of the members 10 and 11 has integral bearing members 27 and 28, respectively, formed on their upper sides near the ears 12 and 13 and these provide pivot bearings for a shaft 29 which is arranged transversely of the members 10 and 11 and connects the same. Near the rear end of each of the members 10 and 11 is formed a bearing 30 or 31 which pivotally supports the ends of another shaft 32 extending between the members 10 and 11. A casting 33, supporting the cutting element 34 and its adjusting mechanism is attached to the shafts 29 and 32 and will be presently described.

The casting 33 is flat on top and has a body 35 rearwardly of the mechanism and a narrow portion 36 extending forwardly. A bearing 37 is formed beneath the portion 36 and depends to provide a journal for the shaft 29 extending therethrough. A bearing 38 is formed on each side of the body portion 35 and depends therefrom to receive the shaft 32, the casting 33 extending above both shafts and being supported thereby. A rectangular opening 39 is formed in the body portion 35 through which the handle 40 of the mechanism extends and which is arranged, at its lower end, upon the shaft 32 and secured thereto by set screw 41, in the manner shown in Figure 1.

Figure 2:
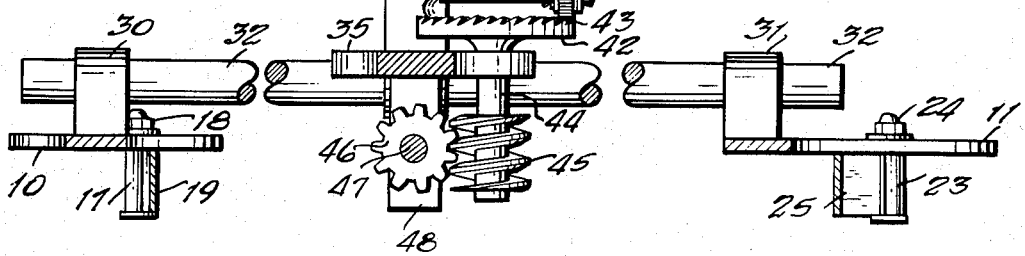
Figure 2 is a transverse cross-sectional view, on lines 2—2 of Figure 1, illustrating the rotating mechanism for the cutting element, including the ratchet wheel, worm gear and worm.

A ratchet wheel 42, having its teeth 43 arranged about the upper surface thereof, as shown in Figures 2 and 4, is formed with a shaft 44 which is positioned vertically and carries a worm 45 on its lower end. The shaft 44 extends downwardly through the body 35 of the casting 33 and meshes with a worm gear 46 on a shaft 47 extending parallel with the member 33 and spaced below the same and rotatably supported in integral supports 48 and 49, rearwardly and forwardly of the casting 33 and depending therefrom, as illustrated in Figure 4. A pawl 50 is connected to the handle 40 through a shaft 51 and is pivotally mounted thereon so that as the handle 40 is moved forwardly and backwardly the pawl 50 will rotate the wheel 42 by engaging its teeth 43, rotating the shaft 44 a fraction of a revolution at each operation whereby the shaft 47 is gradually rotated.

The cutting element 34 is arranged through a slot 52 on the outer end of the shaft 47, in the manner illustrated in Figures 1 and 4, so that the cutting element 34 can be moved a short distance each time the mechanism is operated forwardly by the handle 40, the number of teeth 43 engaged by the pawl 50 being determined by the stroke of the lever 40 limited by the adjusting screw 53 which is arranged through a lug 54 extending upwardly from the rear portion of the body 35 of the member 33 and locked in adjusted position by a lock nut 55 on the screw 53, in the manner shown in Figure 4.

The guide members 19 and 25 are preferably of flexible steel and are formed on each end with tubular loops 56 which are arranged about the bolts 17 and 23 in a manner such as that illustrated in Figure 5. It is preferable to provide a sleeve 57 about the bolts 17 and 23 for the proper operation of the members 19 and 25. This preferred arrangement is illustrated in Figures 5 and 6.

At each stroke of the lever or handle 40 the assembly is moved forwardly of the pattern 58, shown in Figure 3, and pulled backwardly for the next stroke. It is obvious that the mechanism will cause the cutting element 34 to move into a different path each time the mechanism is moved forwardly so that the arcuate surface of the groove 59 is kept the same depth all the way across. The cutting element is then adjusted for a deeper cut which is carried across the groove 59 from end to end so that an even surface is prepared. The movement of the cutting element 34 may be adjusted to occur so that one longitudinal cut will be adjacent to the other and that a smooth appearance will result.

The wooden pattern is originally formed with a rough outline of the groove 59 therein and the cutting element 34 merely provides a suitable finish for the cut which can be accomplished uniformly and with greater ease and requiring much less time than when the operation is formed entirely by hand and with gauges and chisels ordinarily employed for such operations. When the flexible guiding elements 19 and 25 are properly adjusted to the arc required for the particular radius of the mold to be formed, the mechanism can be readily applied to the pattern 58 and caused to follow the arc previously provided by sawing the same to the proper radius so that the cutting operations will automatically follow the radius to be accomplished for the channel 59 which will later become the pattern for the mold in which the pipe bend is cast.

When it is desirable to change the radii of the members 19 and 25 the nuts 18 and 24 of the bolts 17 and 23, respectively, may be loosened and the proper adjustment at each end of the members 10 and 11 accomplished, whereupon the nuts are tightened to fix the flexed guide members 19 and 25 in their proper arcs so that a definite radius is provided. After these adjustments are accomplished it is necessary only that the operator merely slide the mechanism forwardly in each cutting operation, drawing the same rearwardly for a new cut, the handle 40 serving to rotate the shaft 47 whereby the cutting element 34 is changed so that its path will be adjacent to that in its previous movement longitudinally of the curved pattern 58. The cutting element 34 may have various types of engaging tips 60, according to the type of work to which the device is to be applied. The cutting element 34 is secured by a set screw 61 in the end of the shaft 47 so that it is retained rigidly against movement in its cutting operation.

Manifestly, the construction herein shown and described is capable of considerable modification, from time to time, by persons skilled in the art, without departing from the spirit and intent of the invention or the scope of the appended claims.

What is claimed is:

1. In apparatus for routing arcuate grooves in patterns for castings, in combination with a frame comprising a pair of adjustably spaced parallel right- and left-hand bars connected by transversely arranged shafts, a curved portion formed integral with the ends of each of said spaced bars, flexible guide members having their ends adjustably secured to said curved portions and adapted to be arched to different radii, a cutting element operatively supported by said frame and mounted for adjustment transversely of the axis of said grooves, a lever having operative association with said cutting element for moving the same transversely of its path of movement while the said frame is urged forwardly on said work.

2. In a tool for cutting arcuate recesses in patterns for casting pipe bends, in combination with a frame comprising a pair of parallel spaced bars adjustably connected by a pair of spaced shafts arranged transversely of said frame, a lever pivoted on one of said shafts for operating said frame along said pattern, a cutting element supported in said frame adapted to form an arcuate recess in said pattern, means connecting said lever with said cutting element whereby the latter is rotated in operation, means formed on each end of said spaced bars for attaching the ends of flexible guide members for adjustment to different radii, and flexible guide members adjustably attached to the last named means to be conformable in shape to said arcuate recesses.

3. In a tool for cutting arcuate recesses in similarly shaped patterns for casting pipe bends, in combination with a frame comprising paired adjustably spaced bars and paired spaced shafts connecting said bars, a plate supported on said shafts intermediate said bars and a lever pivoted on one of said shafts and supported in said plate for operating said assembly, a cutting tool supported in said frame adapted to be adjusted transversely of said recesses and operated longitudinally thereof by moving said frame therealong, a flexible guide on each of said bars and adjustably secured at their ends thereto to form corresponding arcs, and means connecting said cutting element with said lever whereby said cutting element is operated as the assembly is actuated along said arcuate pattern.

4. In a tool for cutting arcuate recesses in patterns for casting pipe bends, in combination with a supporting frame therefor comprising paired adjustably spaced bars having a pair of shafts connecting the same, a pair of flexible guide members adjustably connected at each end to the ends of said bars whereby to form parallel arcs, a cutting element operatively supported in said frame mounted for adjustment transversely of said recesses and operative longitudinally thereof by moving said frame therealong, and a lever for operating said assembly and turning said cutting element.

References Cited in the file of this patent
UNITED STATES PATENTS

| | | |
|---|---|---|
| 699,285 | Clover et al. | May 6, 1902 |
| 751,671 | McCauley | Feb. 9, 1904 |
| 2,638,136 | Miller | May 12, 1953 |

FOREIGN PATENTS

| | | |
|---|---|---|
| 29,782 | Great Britain | of 1910 |
| 439,122 | Germany | Jan. 4, 1927 |